United States Patent [19]

Brody et al.

[11] Patent Number: 4,721,362

[45] Date of Patent: Jan. 26, 1988

[54] PHASE GRADIENT CONTRAST MICROSCOPE

[75] Inventors: Philip S. Brody, Bethesda; Richard P. Leavitt, Silver Spring, both of Md.

[73] Assignee: The United States of America as represented by the Secretary of the Army, Washington, D.C.

[21] Appl. No.: 739,749

[22] Filed: May 31, 1985

[51] Int. Cl.[4] .................. G02B 27/00; G02B 27/42; G02B 21/06; G03H 1/02
[52] U.S. Cl. .................. 350/320; 350/3.64; 350/3.82; 350/162.13; 350/163; 350/509
[58] Field of Search .................. 350/3.62, 3.64, 163, 350/509, 320, 3.82, 162.12, 162.13, 162.14

[56] References Cited

U.S. PATENT DOCUMENTS

| 2,685,228 | 8/1954 | Kavanagh | 350/163 |
| 3,541,252 | 11/1970 | Collier et al. | 350/3.62 X |
| 3,672,776 | 6/1972 | Brooks | |
| 4,052,119 | 10/1977 | Williams et al. | |

OTHER PUBLICATIONS

Kogelnik, "Holographic Image Projection Through Inhomogeneous Media," *The Bell System Technical Journal*, Dec. 1965, pp. 2451–2455.
Leith et al, "Holographic Imagery Through Diffusing Media, " *Journal of the Optical Society of America*, vol. 56, No. 4, Apr. 1966, p. 523.
Siegman, "Dynamic Interferometry and Differential Holography of Irregular Phase Objects Using Phase Conjugate Reflection," *Optics Communications*, vol. 31, No. 3, Dec. 1979, pp. 257–258.
Feinberg, "Self-Pumped Continuous-Wave Phase Conjugator Using Internal Reflection," *Optics Letters*, vol. 7, No. 10, Oct. 82, pp. 486–488.
Brody, "Phase-Gradient Contrast Using Barium Titanate Optical Phase Conjugators," Technical Digest of the Conference on Lasers and Electro-Optics, Optical Society of America, Jun. 19–22, 1984, Library of Congress No. 83–62643, IEEE Number 84 CH 1965-3, pp. 206–207.
Brody et al., "Dynamic Holographic Method of Imaging Phase Objects," Applied Optics, vol. 56, No. 5, Mar. 1, 1987.

*Primary Examiner*—John K. Corbin
*Assistant Examiner*—David J. Edmondson
*Attorney, Agent, or Firm*—Saul Flbaum; Guy M. Miller; Thomas F. McDonald

[57] ABSTRACT

Apparatus and methods for producing an intensity image from a transparent phase object. A laser beam is generated and expanded. A shutter disposed in the path of the expanded laser beam is opened, and the expanded laser beam is split into first and second beams. The first beam is directed through the transparent phase object and focused into a photorefractive hologram recording crystal for the write time of the crystal. The shutter is closed, and the position of the transparent phase object is shifted an incremental amount. The shutter is opened again so that the first beam is directed through the shifted transparent phase object and into the photorefractive hologram recording crystal such that a phase-conjugate beam is produced traveling in the opposite direction of the first beam. The phase-conjugate beam is collimated, directed through the shifted transparent phase object, and split into third and fourth beams. The third beam is directed into the objective of a microscope to form an intensity image of the transparent phase object.

11 Claims, 9 Drawing Figures

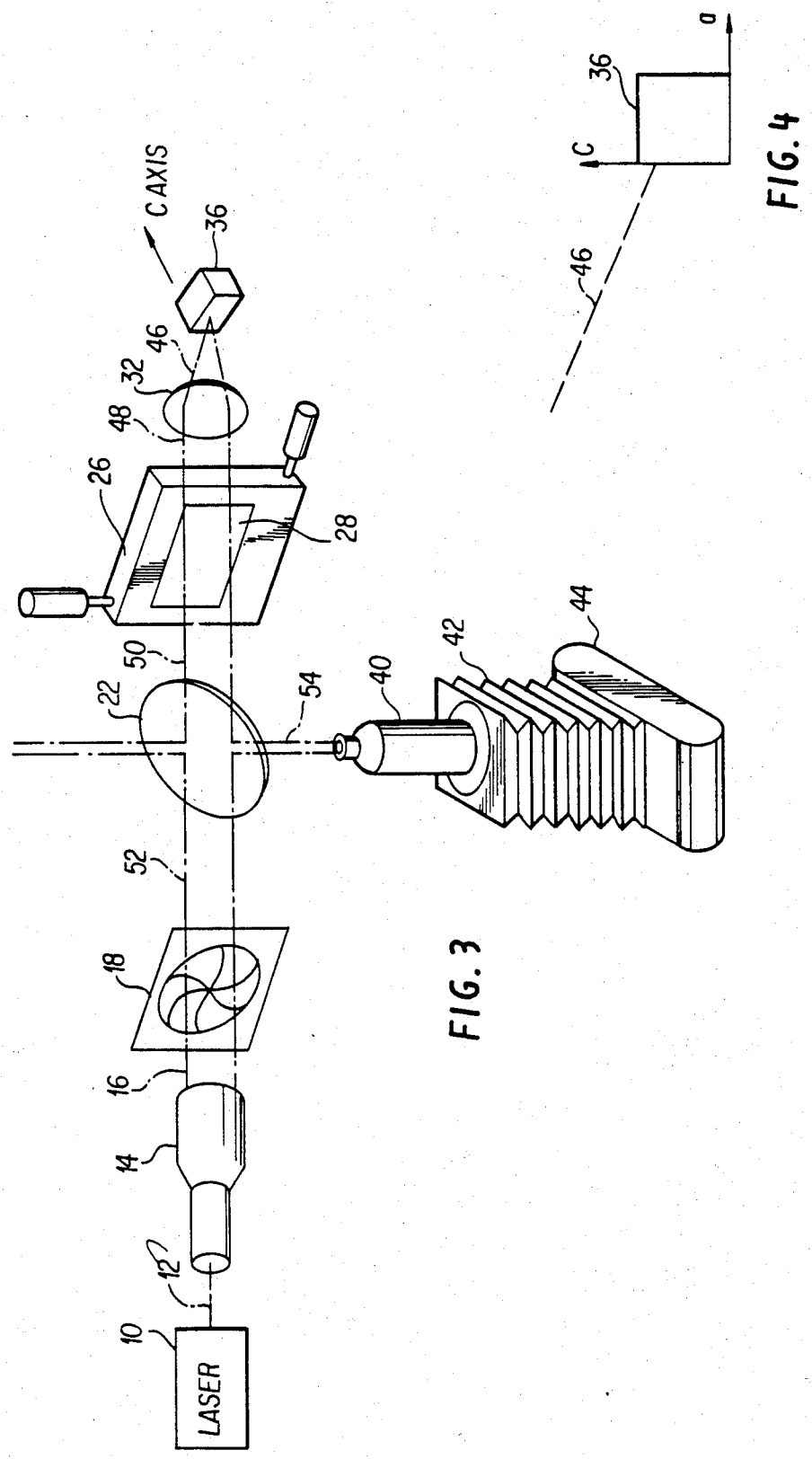

PHASE GRADIENT CONTRAST MICROSCOPE

RIGHTS OF THE GOVERNMENT

The invention described herein may be manufactured and used by or for the United States Government for government purposes without the payment to me of any royalty thereon.

BACKGROUND OF THE INVENTION

The invention described herein is an imaging device that produces an intensity image from a transparent phase object. The image intensity at a point in the image plane is related to the component of the gradient of the phase retardation in a particular direction at a corresponding point in the object plane. The visual aspect of this image is similar to that of an object illuminated by directed, shallow glancing illumination.

The images produced are different from common alternative methods for imaging phase objects, such as Zernike's phase-contrast microscope (where intensities are proportional to the values of the retardation themselves), or interference microscopes (which produce phase contours), or interference and holographic devices (where darkening occurs at points where there is a rapid variation of phase).

SUMMARY OF THE INVENTION

A method is presented for producing an intensity image of the component of the spatial derivative of optical phase retardation in a particular direction from a transparent phase object. In this method a beam of collimate coherent light is produced and directed through the transparent phahse object. The beam of collimated coherent light, after it has passsed through the transparent phase object, is directed to real time photorefractive holographic means for producing and recording a hologram such that a phase-conjugate beam is generated from the hologram. The position of the transparent phase object is shifted, and the phase-conjugate beam is directed through it. The phase-conjugate beam, after it has passed through the shifted transparent phase object, is directed to means for observing the intensity image of the component of the spatial derivative of optical phase retardation in a particular direction. The real time photorefractive holographic means for producing and recording a hologram in this method may comprise a photorefractive hologram recording crystal. This crystal may comprise an oriented crystal of barium titanate in the form of a parallelepiped.

This invention also presents a second method for producing an intensity image from a transparent phase object. In this method a laser beam is generated and expanded by means of a beam expander. A shutter disposed in the path of the expanded laser beam is opened, and the expanded laser beam is directed to a beam splitter. The beam splitter splits the expanded laser beam into first and second beams. The first beam is directed through the transparent phase object. After the first beam passes through transparent phase object, it is focused, by means of a lens, into a photorefractive hologram recording crystal that records a hologram after a certain write time has elapsed. The shutter is closed once the write time expires, and the position of the transparent phase object is shifted an incremental amount. The shutter is opened again, for a time short compared to the write time, so that the first beam from the beam splitter is directed through the shifted transparent phase object, and through the lens into the photorefractive hologram recording crystal, such that a phase-conjugate beam is produced traveling in the opposite direction of the first beam. The phase-conjugate beam is collimated by means of the lens, and it is directed through the shifted transparent phase object. The phase-conjugate beam is split into third and fourth beams, by means of the beam splitter, after the collimated phase-conjugate beam passes through the shifted transparent phase object. Finally, the third beam is directed by means of the beam splitter into the of the transparent phase object. Alternately, the gradient intensity image objective of a microscope to form a phase-gradient intensity image can be observed directly as a holographic reconstruction in a plane perpendicular to the counter-propogating direction of the phase-conjugate beam by using a ground glass screen or other means. The photorefractive hologram crystal may comprise an oriented crystal of barium titanate in the form of a parallelepiped.

A third method is also presented by this invention for producing an intensity image from a transparent phase object. In it a laser beam is generated, and expanded by means of a beam expander. The expanded laser beam is split into first and second beams by means of a beam spliter. The first beam is directed through the transparent phase object. The first beam is focused by means of a lens, after it has passed through the transparent phase object, into a photorefractive hologram recording crystal such that a phase-conjugate beam traveling in the opposite direction of said first beam is produced. The photorefractive hologram crystal may comprise an oriented crystal of barium titanate in the form of a parallelepiped. The phase-conjugate beam is collimated by means of the lens, and the collimated phase-conjugate beam is directed through the transparent phase object. The transparent phase object is shifted in position either an incremental amount, or it is continuously shifted at a steady rate. After the collimated phase-conjugate beam passes through the shifted transparent phase object, it is split into third and fourth beams by means of a beam spliter. Finally, the third beam is directed by means of the beam splitter into the objective of a microscope to form a gradient intensity image of the transparent phase object. Alternately, the gradient intensity image can be observed as a holographic reconstruction in a plane perpendicular to the counter-propagating direction of the phase-conjugate beam by using a ground glass screen or other means.

OBJECT OF THE INVENTION

The object of this invention is to present a method of producing a gradient intensity image from a transparent phase object.

DESCRIPTION OF THE DRAWINGS

FIG. 3 illustrates the same apparatus shown in FIG. 1, except that the third and fourth beams are illustrated.

FIG. 4 shows the crystal of FIG. 2 with the phase-conjugate beam exiting from it.

DESCRIPTION OF THE PREFERRED EMBODIMENTS

Figure 1:
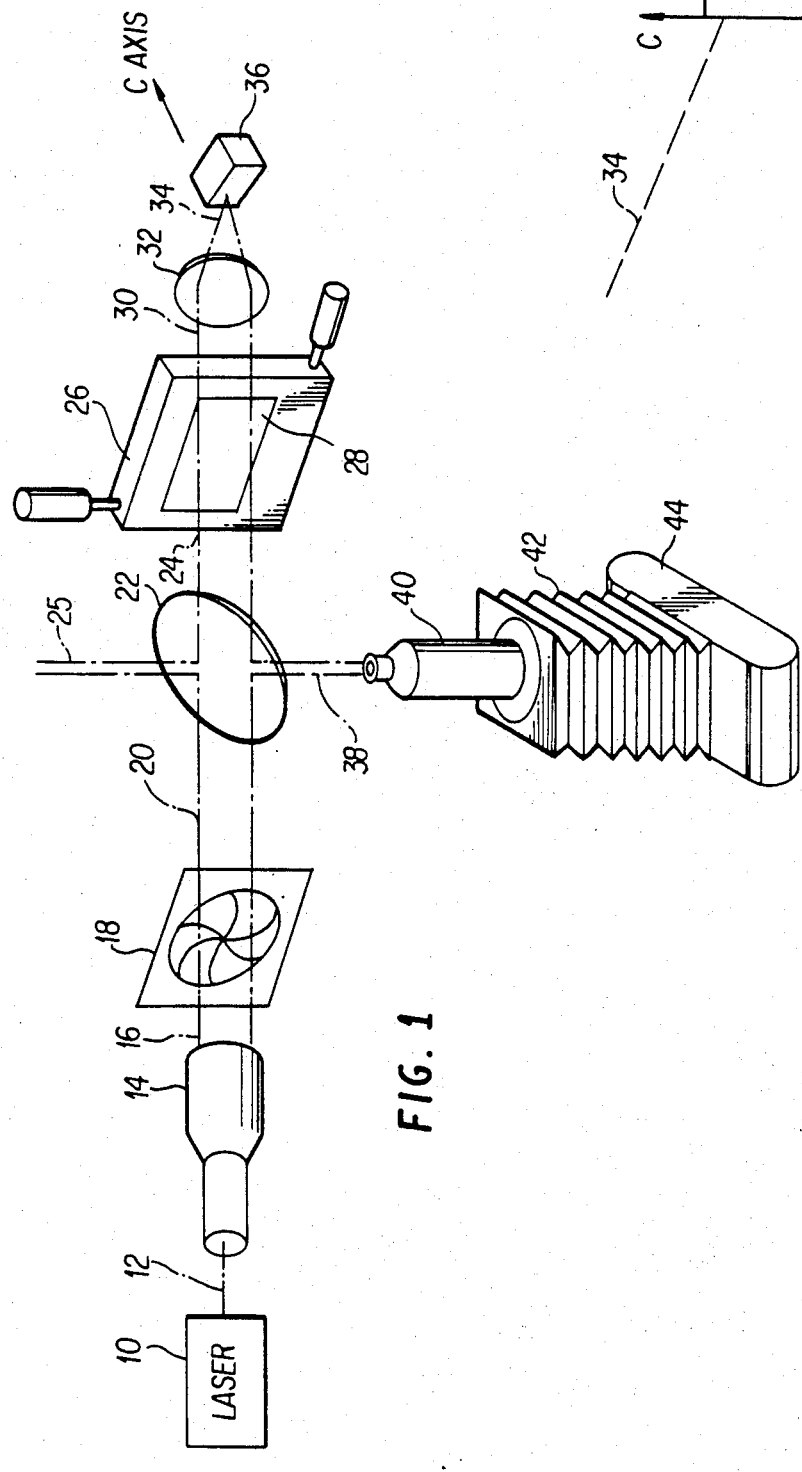
FIG. 1 illustrates the apparatus utilized to produce an intensity image from a transparent phase object. The first and second beams are illustrated in this figure.

The preferred embodiment of the invention is illustrated in FIG. 1. In it laser 10 generates a laser beam 12. Laser beam 12 is expanded by beam expander 14 to produce expanded laser beam 16. Shutter 18 is disposed in the path of expanded laser beam 16 and is used to shut off expanded laser beam 16. Expanded laser beam 16 emerges from shutter 18 as expanded laser beam 20. Expanded laser beam 20 is split into two beams, first beam 24 and second beam 25, by beam splitter 22. First beam 24 passes through beam splitter 22 and is directed through transparent phase object 28. Second beam 25 is not used. Transparent phase object 28 is mounted on a stage 26. Stage 26 allows the position of the transparent phase object to be shifted in two orthogonal directions. Beam 30 exits from transparent phase object 28, and it is directed into positive gathering lens 32. Positive gathering lens 32 focuses beam 30, as shown by 34, into a photorefractive hologram recording crystal 36. Crystal 36 generates a phase-conjugate beam once the hologram is produced in the cystal. The phase-conjugate beam travels in the opposite direction of first beam 24, beam 30, and beam 34. The phase-conjugate beam, represented by 38 in FIG. 1, is directed by beam splitter 22 into the objective 40 of microscope 42. Camera body 44 is attached to microscope 42.

Figure 2:
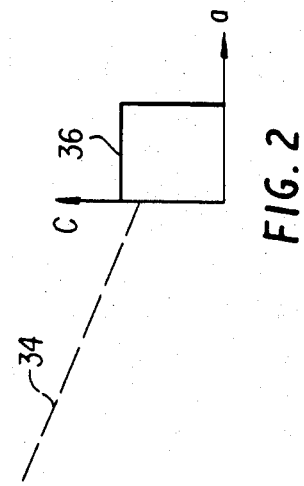
FIG. 2 shows a single face which includes the c and a axes of an oriented crystal of barium titante. Also shown is the first beam entering the crystal.
Figure 5:
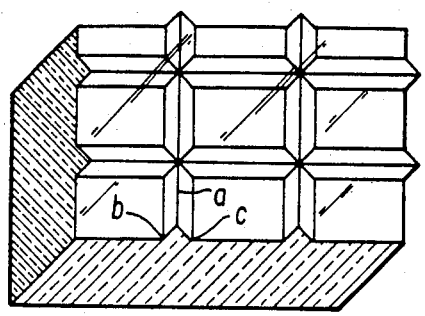
FIG. 5 is a representation of a transparent phase plate. Point a represents the top of a ridge, and point b represents the bottom of a ridge. The height of the ridge is 1.5 μm, and the width of the ridge (from point b to point c) is 400 μm.
Figure 6:
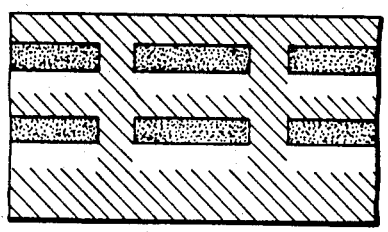
FIG. 6 is a representation of the intensity image obtained by a downward displacement of the transparent phase plate of FIG. 5. The intensity image comprises bright regions, dark regions, and background regions showing rising and falling regions in the plate with respect to the shift direction.
Figure 8:
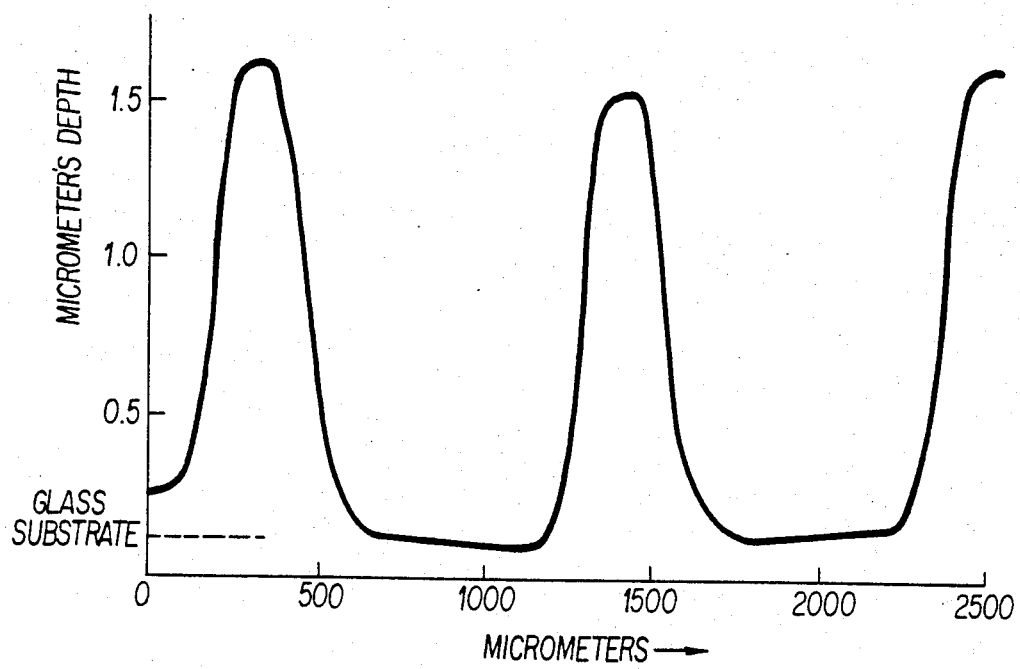
FIG. 8 is a profilometer recording of a typical segment of the grid of FIG. 7 showing the profile of one set of grid ridges.
Figure 7:
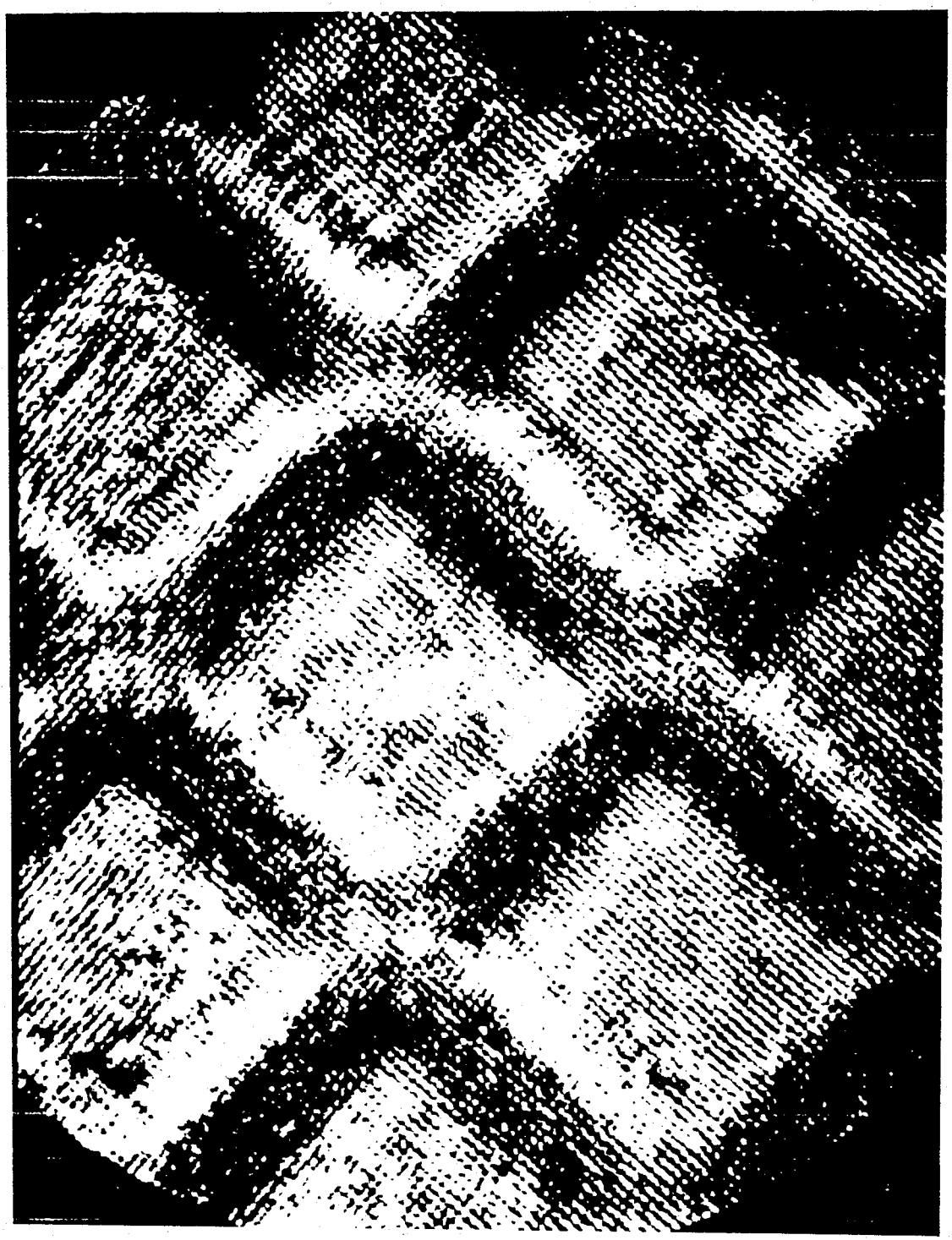
FIG. 7 shows a phase-gradient-contrast image, which was produced from a 1-mm-periodicity photoresist grid consisting of bell-profiled ridges 1.5 μm high and 0.416 mm wide formed on a glass substrate. To form the intensity image a shift of 22 μm (0.022 mm) in the direction perpendicular to grid diagonals was used. The magnification is 35×. Note that the appearance is that of ridges illuminated shallowly in the shift direction.
Figure 9:
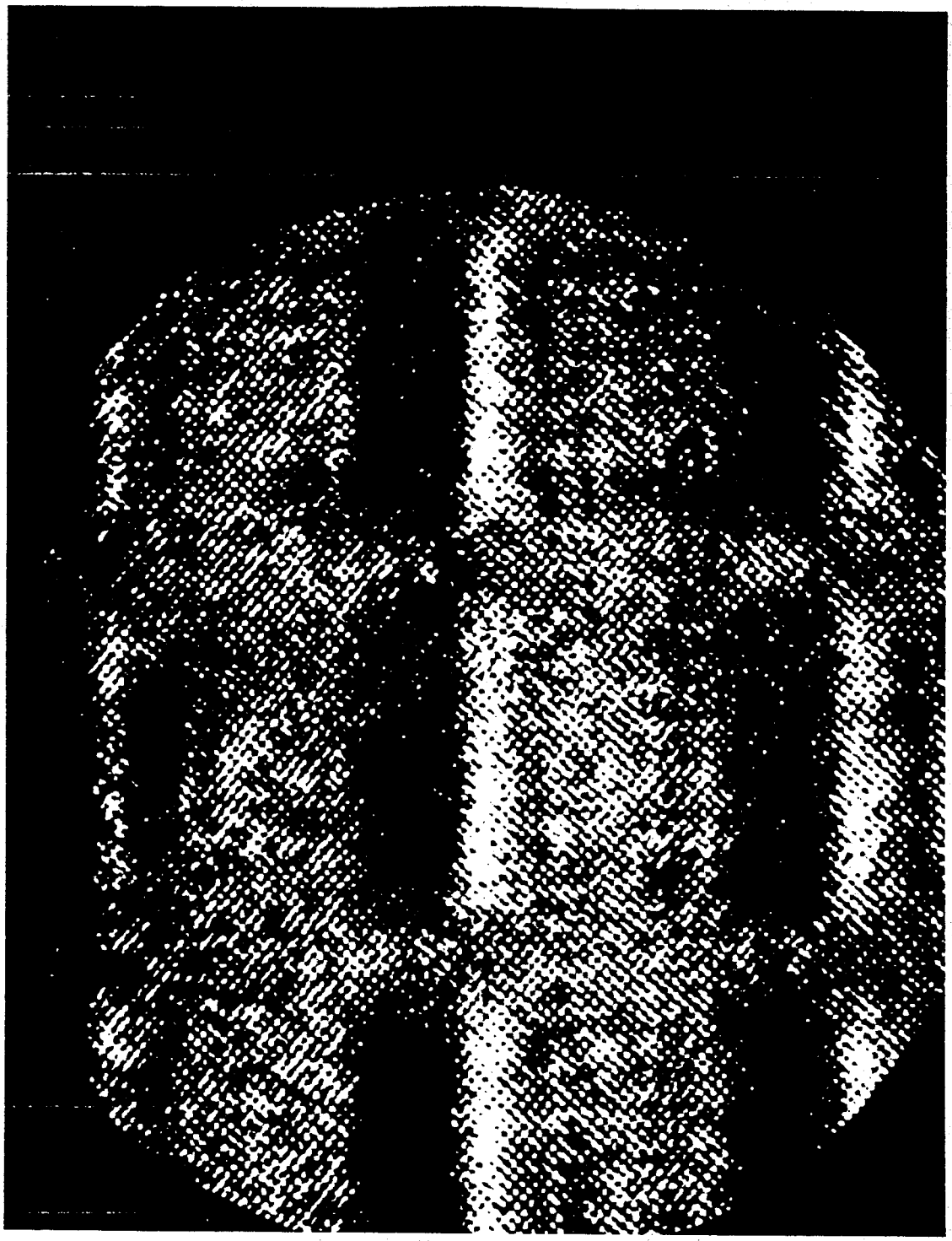
FIG. 9 is another intensity image of the same grating which shows the effect of a shift perpendicular to one set of ridges and therefore parallel to the other set. Since there are no phase gradients in the parallel direction, there is no contrast in that direction, and portions of the image which appeared in FIG. 7 now vanish.

The photorefractive crystal 36 has a write time, which may vary from several seconds to several minutes or more, depending on the particular crystal and illuminatim intensity. The crystal in the preferred embodiment is an oriented crystal of barium titanate in the form of a parallelepiped, with a face which includes the c and a axes. The focused beam of light 34 enters the face of the crystal 36 which includes the c and a axes at the optimal angle for the particular crystal being used, as shown in FIG. 2. The beam 24 enters with polarization parallel to the plane in which the crystal c and a axis lie.

In operation, shutter 18 is held open for the write time of photorefractive hologram recording crystal 36. Shutter 18 is closed once the write time expires. The position of transparent phase object 28 is then incrementially shifted in position. If the laser beam passing through transparent phase object 28 defines the z axis, then transparent phase object 28 can be shifted along the x axis, or along the y axis, or along both the x and y axes. Shutter 18 is again opened, but this time for a time short compared to the write time. This allows the first beam 24 to pass through the shifted phase transparency 28 and to again enter photorefractive hologram recording crystal 36 such that a phase-conjugate beam is produced traveling in the opposite direction of the first beam. The phase-conjugate beam is represented by 46 in FIG. 3. Phase-conjugate beam 46 is collimated by means of lens 32 to produce collimated beam 48. Collimated phase conjugate beam 48 passes through shifted phase transparency 28 and emerges as beam 50. Beam 50 is split into third beam 54 and fourth beam 52 by means of beam splitter 22. Fourth beam 52 propogates back toward shutter 18, beam expander 14, and laser 10. Fourth beam 52 is not used. Third beam 54 is directed into the objective 40 of microscope 42 which forms a phase-gradient intensity image of the transparent phase object 28. The image can be recorded o film, not illustrated, which is cntained in camera body 44. Alternately, the image could be viewed on a ground glass screen. Objective 40 of microscope 42 produces the phase-gradient intensity image from a selected plane of the light counter-propagating along the z-axis. The plane is perpendicular to the direction of propogation, and it is in the near field of light exiting from transparency 28. The image contrast depends on which plane is selected.

In an alternate method of producing an intensity image from a transparent phase object 28, shutter 18 is always open. The first beam is focused, after it passes through transparent phahse object 28, into photorefractive hologram recording crystal 36 by means of lens 32 such that phase-conjugate beam traveling in the opposite direction of the first beam is produced. The phase conjugate beam is represented by 46 in FIG. 3. Phase conjugate beam 46 is collimated by lens 32 to produce collimated phase-conjugate beam 48. This beam passes through transparent phase object 28, which is shifted in position, either along the x axis, the y axis, or both the x and y axes. The transparent phase object may be shifted an incremental amount, or it may be continuously shifted at a steady rate. The collimated phase-conjugate beam exiting from transparent phase object 28, as shown in FIG. 3 by 50, is split by beam splitter 22 into third beam 54 and fourth beam 52. Fourth beam 52 propogates back toward shutter 18, beam expander 14, and laser 10. Fourth beam 52 is not used. Third beam 54 is directed into the objective 40 of microscope 42 which forms a phase-gradient intensity image of the transparent phase object 28. The image can be recorded on film, not illustrated, which is contained in camera body 44, or it can be viewed on a ground glass screen. Objective 40 of microscope 42 produces the phase-gradient intensity image from a selected plane of the light counter-propagating along the z-axis. The plane is perpendicular to the direction of propagation, and it is in the near field of light exiting from transparency 28. The image contrast depends on which plane is selected.

The device described utilizes a single-beam phase conjugator consisting, for example, of an oriented crystal of barium titanate in the form of a parallelepiped, with a face which includes the c and a axes. The focused beam gathered by the lens is intercepted by this face with the axis of the incident cone of light entering of an optimal angle.

It is known that such an arrangement results in the formation of volume phase holograms in the crystal bulk that are self-developing—that is, they form without the intervention of a chemical or other developing process. It is also know that, once formed, these holograms act to return a portion of the input beam intensity as a phase-conjugate beam. That is, if the phase of the original beam is $\phi(x,y)$, the phase after processing by the crystal is $-\phi(x,y)$. This phase-conjugate beam now passes backward through the distorting element that introduced the original phase retardation $\phi(x,y)$ in the forward-directed beam. The effect of the distorting element is now to remove the phase retardation $-\phi(x,y)$ from the phase-conjugate beam. Since the original beam from the beam expander is characterized by nearly plane wave fronts before entering the distorting element, the beam returned through the distorting element is again a coherent, nearly plane-wave beam. This beam produces a uniform bright field when imaged by the microscope. The process described above is known as phase conjugation. Other physical systems can produce phase conjugation. The use of crystal of barium titanate in the present invention, however, allows phase conjugation to occur in real time.

The hologram produced in the crystal volume is transitory with a lifetime of minutes or hours. It is formed in a write time $\tau_w$ and persists in the dark for a lifetime $\tau_l$. During this lifetime any subsequent input beam is returned instantaneously as the phase conjugate of the original write beam and results in a uniform bright field everywhere along the counter-propagating direction if the reading beam is identical to the write beam. However, if before this second exposure but during the lfieitime $\tau_l$ the transparency is changed so that the condition for reversing the original phase distortions is not met, a non-uniform intensity pattern appears in the phase-conjugate beam. In the extreme case where the changed transparency is substantially different from the original object, no beam is returned. We will, however, consider the case where the change is produced by shifting the transparency by an incremental distance.

Before the shift, the phase-distorting transparency produces a phase distortion $\phi(x,y)$. After the plate is shifted by $\Delta x$ in the x-direction and by $\Delta y$ in the y-direction, there is a new phase distortion $\phi(x+\Delta x, y+\Delta y)$. We now assume that the second exposure produces from the stored hologram during its lifetime $\tau_l$ a backward-propagating beam (phase-conjugate beam) of phase $-\phi(x,y)$, which after passing backward through the shifted plate has new phase $\phi(x+\Delta x, y+\Delta y) - \phi(x,y)$. After passing through the transparency, the phase-conjugate beam's amplitude is $$E(x,y,0) = \exp[\phi(x+\Delta x, y+\Delta y) - \phi(x,y)], \quad [1]$$

where we have normalized the amplitude to unity. Consider now the case of a purely sinusoidal, one-dimensional phase grating producing an optical phase distortion, $\phi(x,y) = \delta \cos Kx$, where K is $2\pi/\Lambda$ and where $\Lambda$ is the grating period. In this case, we may write Equation [1] as $$E(x,y,0) = \exp[i\delta \cos K(x+\Delta x) - i\delta \cos Kx] \quad [2]$$
$$= \exp\left[-2i\delta \sin \frac{K\Delta x}{2} \sin K\left(x + \frac{\Delta x}{2}\right)\right].$$

It may be easily shown that the solution to the wave equation for propagation in the +z direction with Equation (2) as the boundary condition at $z=0$ is $$E(x,y,z) = \quad [3]$$
$$\sum_{p=-\infty}^{\infty} (-1)^p J_p\left[2\delta \sin \frac{K\Delta x}{2}\right] \exp\left[i\left[Kp\left(x + \frac{\Delta x}{2}\right) + kz - \frac{(pK)^2 z}{2k}\right]\right]$$

where $J_p(x)$ is a Bessel function of order p and where k is the wave vector of the light ($k = 2\pi/\lambda$, where $\lambda$ is the light wavelength). Equation (3) is valid if $\Lambda \gg \lambda$.

We consider only a small shift where $K\Delta x \ll 1$; that is, the shift $\Delta x$ is assumed shall compared to the grating period $\Lambda$. In that case $J_0 \sim 1$, $J_1 \sim \delta K \Delta x/2$, and $$E(x,y,z) = \left[1 - iK\Delta x \delta \sin Kx \exp\left(-i\frac{K^2 z}{2k}\right)\right]. \quad [4]$$

To first order in $\Delta x$ the intensity is then $$I(x,y,z) = 1 - 2K\Delta x \delta \sin Kx \sin(K^2 z/2k). \quad [5]$$

The intensity variation is thus periodic in the z direction, and its amplitude is a maximum when $$z = k\pi/K^2 = \Lambda^2/2\lambda. \quad [6]$$

At this value of z, the contrast is a maximum and $$I(x,y) = 1 - 2K\Delta x \delta \sin Kx. \quad [7]$$

Thus, for a sinusoidal phase grating, the nonuniform part of the intensity image approaches for small $\Delta x$ the derivative of the grating function, with darkening where the transparency motion increases the optical phase retardation and with brightening where the motion decreases the optical phase retardation.

We have analyzed a situation where the beam is shut off followed by an incremental shift, and a second exposure. The analysis will be essentially the same for the visual observation methods. There is a time lag between the recording of a phase-conjugating hologram in the crystal and its replacement by a new hologram produced from a shifted transparency. Thus, if the transparency is shifted in a time short compared to the rewrite time while the laser is on, there is during this interval a backward propagating wave whose phase is the negative of the phase incident on the transparency before shifting, and a phase-gradient-contrast image appears. The image remains and may be viewed until the new hologram is written and the phase of the backward-propagating beam becomes $-\phi(x+\Delta x, y+\Delta y)$. The image then vanishes. It however can be restored, again momentarily, by repeating the operation. For similar reasons a steady phase-gradient-contrast image appears when he phase transparency is shifted at a steady rate. The existence of a finite write time $\tau_w$ between the initial incidence of laser light and the formation of a hologram in the crystal implies that, if the transparency is continuously shifted, the phase of the phase conjugate beam after traversing the transparency is $\phi(x,y) - \phi(X - v_x\tau_w, y - v_y\tau_w, y - v_y\tau_w)$, where $v_x$ and $v_y$ are the x- and y- components of the translation velocity. The result is an effective displacement that depends on the rate of shift.

We have considered only a single grating period, that is a single spatial frequency, in our analysis. More complex periodic and quasi-periodic spatial phase objects (transparencies) such as nonsinusoidal grids can be viewed in terms of their component spatial frequencies. The interpretation then becomes more complex. The images produced, however, are essentially phase-gradient-contrast images.

While the invention has been described to make reference to the accompanying drawings, we do not wish to be limitied to the details shown therein as obvious modifications may be made by one of ordinary skill in the art.

We claim:

1. A method for producing an intensity image of the component of the spatial derivative of optical phase retardation in a particular direction from a transparent phase object comprising the steps of:
   producing a beam of collimated coherent light;
   directing said beam of collimated coherent light through a transparent phase object substantially located on a plane;
   directing said beam of collimated coherent light, after it has passed through said transparent phase object, to real time photorefractive holographic means for producing and recording a hologram of said transparent phase object;
   incrementally shifting the position of said transparent phase object;
   directing said beam of collimated coherent light through said incrementally shifted transparent phase object;
   directing said beam of collimated coherent light, after it has passed through said incrementally shifted transparent phase object, to said real time photorefractive holographic means for generating a phase conjugate beam of said transparent phase object;
   directing said phase-conjugate beam of said transparent phase object through said shifted transparent phase object;
   directing said phase-conjugate beam of said transparent phase object, after it has passed through said shifted transparent phase object, to observing means; and
   positioning said observing means back or forward from said plane, close to the transparent phase object, but not in the plane of the object, sufficiently far back or forward for a viewer to obtain an intensity image of the component of the spatial derivative of optical phase retardation in a particular direction.

2. The method of claim 1 wherein said real time photorefractive holographic means for producing and recording a hologram such that a phase-conjugate beam is generated from said hologram comprises a photorefractive hologram recording crystal.

3. The method of claim 2 wherien said photorefractive hologram recording crystal comprises an oriented crystal of barium titanate in the form of a parallelepiped.

4. A method for producing an intensity image from a transparent phase object comprising the steps of:
   generating a laser beam;
   expanding said laser beam by means of a beam expander;
   opening a shutter disposed in the path of said expanded laser beam;
   splitting said expanded laser beam into first and second beams, after said expanded laser beam passes through said shutter, by means of a beam splitter;
   directing said first beam through a transparent phase object substantially located on a plane;
   focusing said first beam, after said first beam passes through said transparent phase object, into a photorefractive hologram recording crystal that records a hologram after a certain write time has elapsed, by means of a lens;
   closing said shutter once said write time expires;
   shifting the position of said transparent phase object an incremental amount;
   opening said shutter, for a time short compared to said write time, so that said first beam from said beam splitter is directed through said shifted transparent phase object, and through said lens into said photorefractive hologram recording crystal, such that a phase conjugate beam of said transparent phase object is produced traveling in the opposite direction of said first beam;
   collimating said phase-conjugate beam of said transparent phase object by means of said lens;
   directing said collimated phase-conjugate beam of said transparent phase object through said shifted transparent phase object;
   splitting said collimated phase-conjugate beam into third and fourth beams, after said collimated phase-conjugate beam of said transparent phase object passes through said shifted transparent phase object, by means of said beam splitter:
   directing said third beam to observing means; and
   positioning said observing means back or forward from said plane, close to the transparent phase object, but not in the plane of the object, sufficiently far back or forward for a viewer to obtain a gradient intensity image of said transparent phase object.

5. The method of claim 4 wherein said photorefractive hologram crystal comprises an oriented crystal of barium titanate in the form of a parallelepiped.

6. The method of claim 4 wherein said means for forming a gradient intensity image comprises a microscope.

7. A method for producing an intensity image from a transparent phase object comprising the steps of:
   generating a laser beam;
   expanding said laser beam by means of a beam expander;
   splitting said expanded laser beam into first and second beams;
   directing said first beam through a transparent phase object substantially located on a plane;
   focusing said first beam, after said first beam passes through said transparent phase object, into a photorefractive hologram recording crystal such that a phase-conjugate beam of said transparent phase object traveling in the opposite direction of said first beam is produced;
   collimating said phase-conjugate beam of said transparent phase object by means of said lens;

directing said collimated phase-conjugate beam of said transparent phase object through said transparent phase object;
shifting the position said transparent phase object;
splitting said collimated phase-conjugate beam into third and fourth beams, after said collimated phase-conjugate beam of said transparent phase object passes through said shifted transparent phase object, by means of said beam spliter;
directing said third beam to observing means; and
positioning said observing means back or forward from said plane, close to the transparent phase object but not in the plane of the object, sufficiently far back or forward for a viewer to obtain a gradient intensity image of said transparent phase object.

8. The method of claim 7 wherein said transparent phase object is shifted an incremental amount.

9. The method of claim 7 wherein said transparent phase object is continuously shifted at a steady rate.

10. The method of claim 7 wherein said photorefractive hologram crystal comprises an oriented of barium titanate in the form of a parallelepiped.

11. The method of claim 7 wherein said means for forming a gradient intensity image comprises a microscope.

* * * * *